Feb. 26, 1963    J. M. HILL    3,078,751
CRANKSHAFT POSITIONING APPARATUS
Filed Dec. 7, 1961    3 Sheets-Sheet 1

INVENTOR.
JOSEPH M. HILL.
BY Murray & Young
his ATTORNEYS

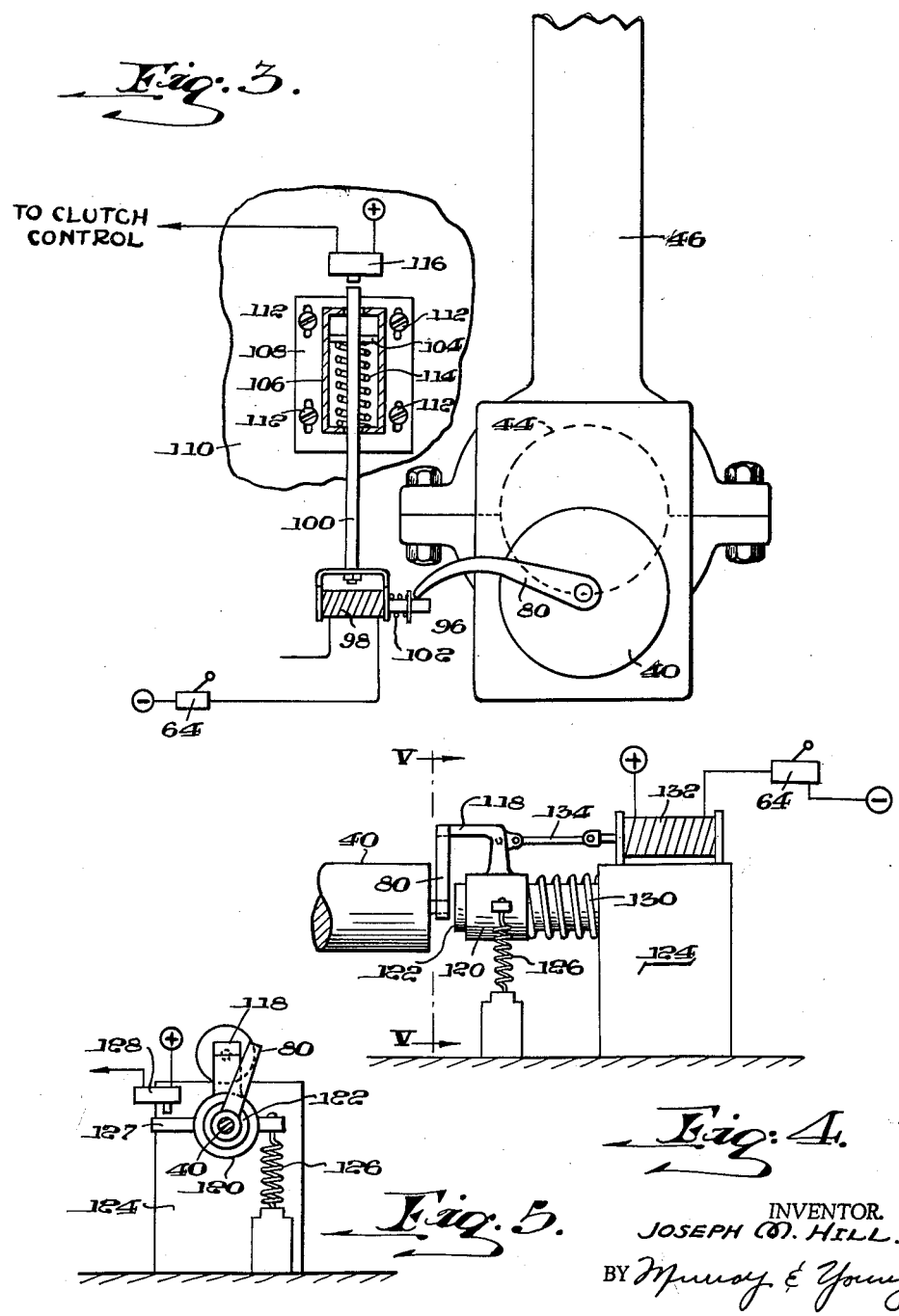

Feb. 26, 1963 J. M. HILL 3,078,751
CRANKSHAFT POSITIONING APPARATUS
Filed Dec. 7, 1961 3 Sheets-Sheet 3

INVENTOR.
JOSEPH M. HILL
BY Murray & Young
his ATTORNEYS

United States Patent Office 3,078,751
Patented Feb. 26, 1963

3,078,751
CRANKSHAFT POSITIONING APPARATUS
Joseph M. Hill, 8016 Marmion Drive, Pittsburgh 37, Pa.
Filed Dec. 7, 1961, Ser. No. 157,797
11 Claims. (Cl. 83—72)

This invention relates to apparatus for controlling a clutch and brake arrangement designed to rotate a crankshaft or the like through a single revolution, such crankshaft arrangement being usable in flying cutoff devices, presses and other similar tools. More particularly, the invention relates to apparatus adapted to compensate for angular displacement of the crankshaft from a starting position when the clutch is initially engaged.

Although not limited thereto, the present invention is particularly adapted for use with flying cutoff apparatus which severs continuously moving material into pieces of uniform length. For example, in a continuous forming line for tubes and other cross-sectional shapes, a cutoff press is provided at the end of the line. In the usual cutoff press of this type, the continuous shape passes through a slideable die adapted to receive a shear or punch which itself slides with the die, the arrangement being such that during a severing operation, the die and shear move forwardly with the shape while the shear is forced downwardly into the die to produce a cut, usually removing a slug across the shape equal in length to the shear punch thickness. The pnnch is moved downwardly into the die and then upwardly into its original starting position by means of a platen which is connected to a crankshaft such that one complete revolution of the crankshaft will move the punch downwardly and then upwardly through a complete cycle. The crankshaft is connected through a clutch-brake arrangement to a continuously rotating flywheel, the clutch-brake including electrical control apparatus to initially engage the clutch and thereafter apply the brake to rotate the crankshaft through approximately one revolution.

In order to engage the clutch and actuate the press to initiate the cutting operation, it has been common to employ an electrical system utilizing a limit switch which is triggered by the forward end of the stock, the arrangement being such that when the limit switch is tripped the clutch will be engaged to rotate the crankshaft through one revolution. Another system sometimes employed to trigger the press employs an electronic system which measures the length of the shape as it passes by and actuates the clutch to initiate a cutting operation at a predetermined length determined by the electrical control system. A still further system for actuating the press employs a finger or the like which is connected through a linkage to the slidable punch and shear, the arrangement being such that when the forward end of the stock strikes the finger, it will move the finger and the punch and shear forwardly. This forward movement, in turn, trips a limit switch which, through suitable circuitry, engages the clutch.

One difficulty with the systems outlined above is that they all depend upon the correct positioning of the crankshaft at the initiation of each cutting operation. That is, if each piece severed by the cutoff apparatus is to be of the same length, then the crankshaft must start from exactly the same position (i.e., top dead center) in order to produce cut pieces of equal length. Otherwise, if the crankshaft lags the correct starting position when the clutch is engaged, the cut tube will be longer than desired; and, similarly, if it leads the correct starting position the cut tube will be shorter than desired. Unfortunately, the clutch-brake arrangement referred to above will not position the crankshaft at exactly the correct starting position for each cycle of operation with the result that the cut tubes often vary in length to a considerable degree.

As an overall object, the present invention seeks to provide apparatus, in combination with a cutoff press of the type described above, for producing cut tubes of uniform length.

More specifically, an object of the invention is to provide, in combination with an electrically controlled clutch and brake arrangement designed to rotate the crankshaft or the like from a starting point through a single revolution in response to actuation of switch means, of apparatus for compensating for angular displacement of the shaft from its starting point when the switch means is actuated.

In accordance with the invention, hereinafter described in detail, there is provided a projection on the crankshaft, a time delay mechanism engageable with said projection and having a time delay period dependent upon the angular displacement of the shaft from its correct starting point or top dead-center position, and circuit means including a switch operable by the time delay mechanism after its time delay period has expired for engaging the clutch to rotate the crankshaft. As will be seen, the time delay effected by the aforesaid mechanism compensates for any angular displacement of the shaft from its correct starting position; and, hence, provides for accurate and uniform lengths produced by flying cutoff presses and the like.

The above and other objects and features of the invention will become apparent from the following detailed description taken in connection with the accompanying drawings which form a part of this specification, and in which:

FIG. 3 is a schematic illustration of another embodiment of the invention;

FIG. 4 is an illustration of another embodiment of the invention similar to the embodiments shown in FIGS. 2 and 3;

FIG. 5 is a cross-sectional view taken along line V—V of FIG. 4;

Figure 1:
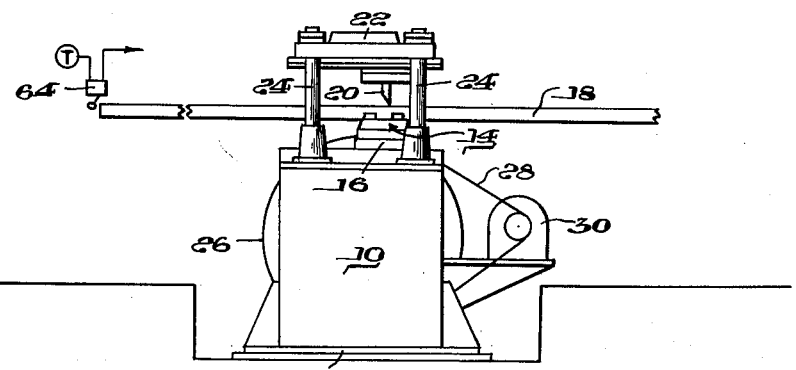
FIGURE 1 is a schematic illustration of flying cutoff apparatus of the type with which the present invention may be used.

Referring now to the drawings, and particularly to FIG. 1, a conventional flying cutoff press 10 is shown which includes a base 12 which supports the slideable cutoff shear mechanism 14 having a die 16 through which the stock 18 to be severed passes and a cutting tool 20 which is adapted to be forced downwardly into the die 16 by the upper ram 22 of the press 10. The ram 22 is connected through columns 24 to a crankshaft, not shown in FIG. 1, contained within the base 12. This crankshaft, in turn, is connected through a pneumatic clutch to a flywheel 26 which is driven through a belt 28 connected to a motor 30, the arrangement being such that when the pneumatic clutch is engaged, the flywheel will rotate the crankshaft through one revolution to lower the upper ram 22 and force the cutting tool 20 into the die 16 while effecting a cutoff operation.

Figure 2:
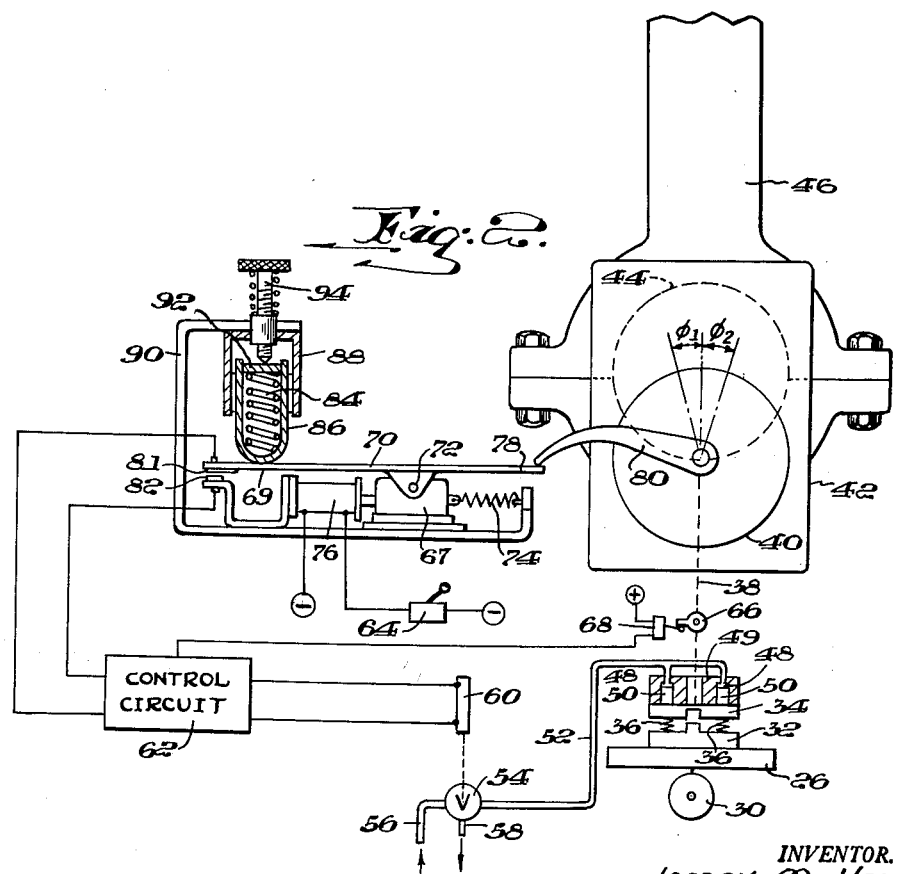
FIG. 2 is a schematic illustration of one embodiment of the invention for compensating for angular displacement of a crankshaft or the like from its correct starting position.

Referring now to FIG. 2, it will be seen that the motor 30 is connected to the flywheel 26 which, in turn, is connected to a driving clutch member 32. As shown, the clutch member 32 is adapted to engage a driven clutch member 34, the two clutch members being normally urged apart by means of springs 36 or other similar devices. The driven clutch member 34 is connected through a mechanical linkage 38 to the main shaft 40 of the crankshaft for press 10. The shaft 40 is provided with the usual cheek plates 42 interconnected by means of a crankshaft pin 44. Journaled on the pin 44 is a connecting rod 46 which, in turn, is connected through the columns 24 (FIG. 1) to the upper ram 22, the arrangement being such that when the shaft 40 is rotated through one complete revolution, the ram 22 will be forced downwardly and then upwardly into its original starting position.

In order to engage the driving and driven clutch members 32 and 34, respectively, there are provided a pair of cylinders 48 in a brake backing plate 49 for the driven clutch member 34. Carried within the cylinders 48 are pistons 50, the arrangement being such that when air is supplied to the cylinders 48 the pistons 50 will force the driven clutch member 34 into engagement with driving clutch member 32 whereby the flywheel 26 will cause the shaft 40 to rotate. When, however, the pressure is released in the cylinders 48, the springs 36 will force the driven clutch member 34 into engagement with the brake backing plate 49 to stop the shaft 40.

The cylinders 48 are connected through conduit 52 to a solenoid-operated valve 54 which is adapted to connect the cylinders to a source of fluid under pressure, not shown, through conduit 56 or, alternatively, to connect the cylinders 48 to atmosphere or exhaust through conduit 58. When the solenoid 60 for valve 54 is not energized, the valve will normally connect the conduit 52 to conduit 58 whereby the springs 36 will urge driven member 34 out of engagement with driving member 32 such that the shaft 40 will be stationary.

In prior art devices of this type, the clutch shown in FIG. 2 was commonly actuated through a control circuit 62 by means of a limit switch 64 (FIG. 1) located in the path of travel of the stock 18 such that the limit switch 64 could be tripped to engage the clutch when a predetermined length of the stock had passed beyond the cutting tool 20. In this manner, an attempt was made to cut pieces of equal length from the stock 18, the idea being that since the limit switch 64 was located at a fixed distance from the punch, each time it was tripped the punch would be forced downwardly to sever a piece of the stock equal in length to the distance between the limit switch and the punch.

A system of the type described above, however, is based upon the assumption that the crankshaft will always be at top dead-center position when the limit switch 64 is tripped. That is, if the crankshaft should lag the top dead-center position when the limit switch 64 is tripped, then it will take a longer period of time for the punch to move downwardly and sever the stock than it would if the crankshaft were exactly at top dead-center position, meaning that the cut piece would be longer than in the case where the crankshaft was exactly at top dead center. Similarly, if the crankshaft leads the top dead-center position, then the cut piece will be shorter than it otherwise would.

Unfortunately, clutch and brake arrangements such as that shown in FIG. 2 are not capable of stopping the crankshaft at exactly its top dead-center position after every single revolution. As shown in FIG. 2, a cam 66 or the like is provided on the connection 38; and this cam actuates limit switch 68 which, through the control circuit 62, deenergizes the solenoid 60 and connects conduit 52 to exhaust conduit 58 to release the pressure within cylinders 48 and permit the springs 36 to move the driven member 34 into engagement with the brake backing plate 49 to stop the crankshaft. In the normal cycle of operation of prior art devices, the limit switch 64 was initially tripped to energize solenoid 60, thereby actuating the valve 54 to connect pressure to the cylinders 48 and engage the clutch members 34 and 32 to cause the shaft 40 to rotate. After a predetermined number of degrees of rotation of the shaft 40, the limit switch 68 was tripped by cam 66 to deenergize the solenoid 60 and release the clutch member 34 such that the springs 36 would force the driven member 34 into engagement with the brake backing plate 49 and stop shaft 40. With this arrangement, the shaft 40 does not always stop at top dead center, but rather may lead or lag the top dead-center position by maximum angles identified as $\phi_1$ and $\phi_2$, respectively, in FIG. 2. Consequently, with the prior art arrangement uneven lengths of material were cut from the moving stock 18.

In accordance with the present invention, means are provided for compensating for the lag or lead of shaft 40 from its top dead-center position; and in the embodiment of FIG. 2 such means comprises a reciprocable carriage 67 which carries a bar or lever 70 pivotally connected to the carriage 67 as at 72. The carriage 67 is normally urged toward the shaft 40 by means of a coil spring 74, but may be moved away from the shaft by means of a solenoid 76 which, in accordance with the present invention, is actuated by means of the limit switch 64 at the forward end of stock traveling through the press 10. When the solenoid 76 is deenergized, the spring 74 will pull the carriage 67 and member 70 to the right as shown in FIG. 2 whereby its right end 78 will be in the path of travel of a projection or arm 80 on the shaft 40. On the other hand, when the solenoid 76 is energized by closure of limit switch 64, the carriage 67 and member 70 will be pulled to the left as viewed in FIG. 2 to move end 78 out of the path of travel of the arm 80.

The other or left-hand end 69 of the member 70 is provided with an insulated electrical contact 81 adapted to engage a stationary contact 82. Contacts 81 and 82 are, in turn, connected in a circuit to the control circuit 62 such that when the contacts close the solenoid 60 will be energized to initiate a cycle of operation of the crankshaft. Above the left-hand end 69 of the member 70 is a coil spring 84 carried within a hollow plunger 86. The plunger 86 is reciprocable within an inverted cylinder 88 carried on a bracket 90, and the upper end of spring 84 engages a plate 92 which, in turn, is engaged by means of a thumbscrew 94, the arrangement being such that the pressure on spring 84 may be varied by turning the thumbscrew 94.

In the operation of the device, the arm 80 will engage the end 78 of member 70 when the shaft 40 is in close proximity to top dead-center position. That is, it will engage end 78 within the maximum lead and lag angles $\phi_1$ and $\phi_2$. When the limit switch 64 is actuated by the forward end of the traveling stock 18, it will engage the solenoid 76 to pull the carriage 67 and member 70 out of the path of travel of arm 80, thereby permitting the spring 84 to force the left end 69 of member 70 downwardly until the contacts 81 and 82 close to energize solenoid 60 and initiate a cycle of operation of the crankshaft. As will be understood, the time required for the contacts 81 and 82 to close is a function of the distance separating them when the solenoid 76 is energized; and this distance, in turn, is dependent upon the angular position of the shaft 40 and arm 80 with respect to top dead center. That is, if the shaft should lag the top dead-center position, then the radially outward end of arm 80 will be above the position for an exact top dead-center condition such that the contacts 81 and 82 will be closer together when the solenoid 76 is energized. Similarly, if the crankshaft leads top dead-center position, the spacing between contacts 81 and 82 will be increased. It can thus be seen that the device of FIG. 2 provides a time delay between actuation of switch 64 and energization of solenoid 60 to start a cycle of operation of the crankshaft. Furthermore, this time delay will increase from a minimum at the maximum lag angle to a maximum at the maximum lead angle.

In FIG. 3 another embodiment of the invention is shown wherein elements corresponding to those of FIG. 2 are identified by like reference numerals. In this case, the arm 80 engages the end of an armature 96 for a solenoid 98 carried on the lower end of a reciprocable rod 100. The forward end of armature 96 is normally urged into the path of travel of the arm 80 by means of a coil spring 102, but will be withdrawn from the path of travel of arm 80 upon actuation of limit switch 64 which energizes the solenoid 98. Secured to the upper end of the rod 100 is a washer or collar 104 which reciprocates within a cylinder 106 fixed to a backing plate 108, this backing plate being adjustably mounted on a support member 110 by means of screws 112 extending through elongated slots in the backing plate 108. Between the washer 104 and the bottom of cylinder 106 is coil spring 114 which urges the rod 100 upwardly, thereby urging the forward end of armature 96 into engagement with the arm 80 when the shaft 40 is in close proximity to the top dead-center position. Upon energization of the solenoid 98, the armature 96 will be withdrawn out of the path of travel of arm 80, thereby permitting the coil spring 114 to urge rod 100 upwardly to close limit switch 116. Switch 116, in turn, serves the same function as contacts 81 and 82 of FIG. 2 in initiating a cycle of operation of the crankshaft. It can be seen that with this arrangement, the time required for the rod 100 to move upwardly under the force of spring 114 is dependent upon the angular position of shaft 40 with respect to top dead-center position. If the shaft lags top dead-center position when the limit switch 64 is actuated, the upper end of the rod 100 will be much closer to limit switch 116 than it will be when the shaft 40 leads the top dead-center position. The result is the same as that accomplished by the apparatus of FIG. 2. That is, a time delay is effected, and this time delay increases from a minimum to a maximum from the maximum lag angle to the maximum lead angle.

In the embodiment of FIGS. 4 and 5, a projection 80 is again provided on shaft 40, but in this case it engages an arm 118 extending upwardly from a collar 120 which is slideably received on a shaft 122. The shaft 122 is supported on block 124 and is coaxial with the shaft 40. As shown in FIG. 5, a coil spring 126 normally urges the collar 120 and its arm 118 into engagement with the projection 80 when the shaft 40 is in close proximity to top dead-center position. If the arm 118 is withdrawn out of the path of travel of arm 80, however, the spring 126 will cause the collar 120 to rotate in a clockwise direction as shown in FIG. 5 until it reaches a point where a projection 127 on the collar trips a limit switch 128, this limit switch serving the same function as contacts 81 and 82 in the embodiment of FIG. 2.

The collar 120 and its arm 118 are normally urged into the path of travel of the projection 80 by means of a coil spring 130 which encircles the shaft 122. The collar 120 and arm 118, however, may be withdrawn from the path of travel of arm 80 by means of a solenoid 132 connected to the arm 118 through a suitable linkage 134. Solenoid 132, in turn, is actuated by means of the limit switch 64.

In the operation of the device of FIGS. 4 and 5, the arm 118 will be rotated into engagement with the arm 80 when the shaft 40 is in close proximity to top dead-center position. If the shaft 40 should lag its top dead-center position, the spring 126 will rotate the collar 120 into a position where the projection 127 is closer to the limit switch 128 than it will be when the shaft 40 leads its top dead-center position. Thus, when solenoid 132 is energized to withdraw arm 118 out of the path of travel of arm 80, a time delay will be effected as in the other embodiments, and this time delay will increase from a minimum at the maximum lag angle to a maximum at the maximum lead angle.

Figure 7:
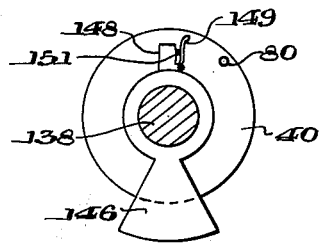
FIG. 7 is a cross-sectional view taken along line VII—VII of FIG. 6.
Figure 6:
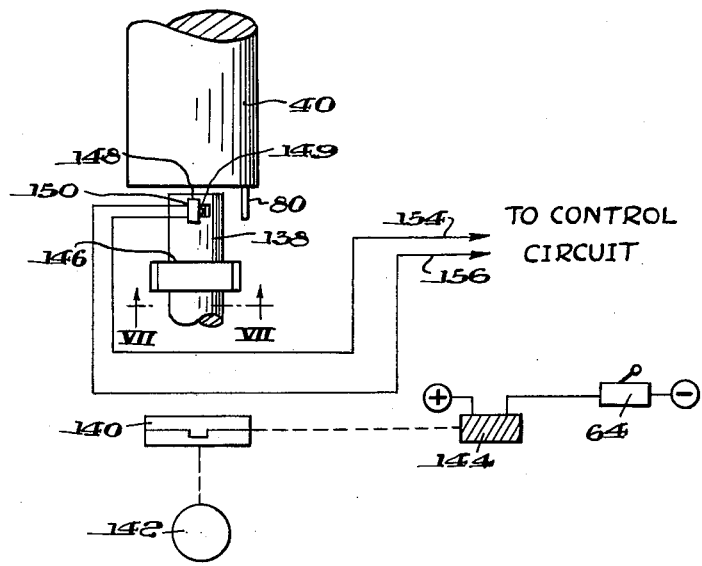
FIG. 6 is a top view of another embodiment of the invention.

In the embodiment of FIGS. 6 and 7, a second shaft 138 is arranged in coaxial relationship with respect to shaft 40. The shaft 138, in turn, is adapted to be connected through clutch 140 to a continuously rotating motor 142 which, in the embodiment shown, is separate and apart from the motor 30 and flywheel 26 which drive the shaft 40, although means may be alternatively provided to rotate the clutch 140 from a power take-off on flywheel 26. The clutch 140 is engaged to drive shaft 138 by means of a solenoid 144, this solenoid being energized by the limit switch 64 which corresponds to the limit switches 64 shown in the other embodiments of the invention. Carried on the shaft 138 is a counterweight 146 which, when the clutch 140 is disengaged, will cause the shaft 138 to always assume the same angular position. Carried on the shaft 138 above the counterweight 146 is a limit switch 148 having a leaf spring actuating lever 149 connected to its lower end adjacent shaft 138. The upper or free end of the lever 149 is adapted to engage the projection 80 on shaft 40 to press the actuating button 151 of switch 148 and close the same when shaft 138 rotates in a clockwise direction relative to shaft 40 as viewed in FIG. 7. When, however, shaft 40 overruns shaft 138 in a clockwise direction, the projection 80 will merely pass over the leaf spring actuating lever 149 without closing the switch. The limit switch 148, in turn, is connected through leads 154 and 156 to a control circuit similar to circuit 62 shown in FIG. 2. In this respect, it will be understood that the limit switch 148 serves the same purpose as the contacts 81 and 82 in FIG. 2.

In the operation of the system of FIGS. 6 and 7, when the limit switch 64 is tripped it will energize solenoid 144 to engage the clutch 140 momentarily, thereby causing the shaft 138 to rotate until the leaf spring actuating lever 149 of limit switch 148 engages the projection 80, the position of this projection being dependent upon the angular position of the shaft 40 with respect to top dead-center position. Thus, a time delay is again effected which is dependent upon the lead or lag angle with respect to the top dead-center position. The clutch 140 is engaged just long enough to rotate shaft 138 through less than one revolution so that after the clutch 140 momentarily rotates the shaft 138 and disengages, the counterweight 146 will cause the shaft to rotate back to its exact starting position shown in FIG. 7. Thereafter, as the projection 80 rotates through a complete revolution, it will merely pass over the leaf spring actuating lever 149 without tripping the limit switch 148. In other words, the limit switch will be tripped only when the shaft 138 initially rotates relative to shaft 40. The position of projection 80 on shaft 40 will vary depending upon the angular position of the shaft 40 with respect to its top dead-center position as in the other embodiments of the invention. This variance in the angular position of shaft 40 will, of course, be compensated for on the next cycle of operation when the limit switch 64 is actuated.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In combination with an electrically controlled clutch and brake arrangement designed to rotate a crankshaft or the like from a starting point through a single revolution in response to actuation of switch means; the improvement of means for compensating for angular displacement of the shaft from said starting point when the switch means is actuated comprising a radial projection on said shaft, time delay mechanism engageable with said projection and having a time delay period dependent only upon the angular displacement of the shaft from said starting point, and circuit means including a switch operable by the time delay mechanism after its time delay period has expired for initially engaging said clutch to start rotation of the shaft.

2. The combination of claim 1 wherein the time delay period of said mechanism increases from a minimum when the angular displacement of said shaft lags said starting point by a predetermined number of degrees to a maximum when the angular displacement of the shaft leads said starting point by a predetermined number of degrees.

3. Apparatus for cutting off pieces of uniform length from a continuous length of moving stock comprising, in combination, stock severing apparatus of the type in which a severing tool is forced through the stock upon rotation of a crankshaft from a starting point through a single revolution in response to actuation of switch means engageable by the stock, an electrically controlled clutch and brake arrangement designed to rotate said crankshaft from said starting point through a single revolution in response to actuation of said switch means, and means for compensating for angular displacement of the shaft from said starting point when the switch means is actuated by said stock comprising a radial projection on said shaft, time delay mechanism engageable with said projection and having a time delay period dependent only upon the angular displacement of the shaft from said starting point, and circuit means including a switch operable by the time delay mechanism after its time delay period has expired for initially engaging said clutch to start rotation of the shaft and sever the stock.

4. In combination with an electrically controlled clutch and brake arrangement designed to rotate a crankshaft or the like from a starting point through a single revolution in response to actuation of switch means; the improvement of means for compensating for angular displacement of the shaft from said starting point when the switch means is actuated comprising a projection on said shaft, a member pivotal intermediate its ends and having one end in the path of travel of said projection and engageable with the projection when the shaft is in close proximity to said starting point, adjustable spring means engaging the other end of said member and biasing said one end into engagement with said projection, circuit means including a switch for engaging said clutch upon pivotal movement of said member under the force of said spring, and a device actuable by said first-mentioned switch means for withdrawing said one end of the member out of the path of travel of said projection to permit the spring to move said member.

5. In combination with an electrically controlled clutch and brake arrangement designed to rotate a crankshaft or the like from a starting point through a single revolution in response to actuation of switch means; the improvement of means for compensating for angular displacement of the shaft from said starting point when the switch means is actuated comprising a projection on said shaft, carriage means movable to and away from said shaft, first spring means urging the carriage means toward said shaft, a member pivotally carried on said carriage means about an axis extending parallel to the axis of said shaft, said pivotal member having one end in the path of travel of said projection and engageable with said projection when the shaft is in close proximity to said starting point, adjustable spring means engaging the other end of said member and urging said member to rotate about its pivotal axis in a direction opposite to the direction of rotation of said shaft whereby said one end of the member will engage said projection when the shaft is in close proximity to said starting point, means for moving said carriage means away from said shaft in response to actuation of said switch means to thereby move said one end of the member out of the path of travel of said projection on the shaft, and circuit means including a switch for engaging said clutch upon pivotal movement of said member under the force of said adjustable spring means.

6. In combination with an electrically controlled clutch and brake arrangement designed to rotate a crankshaft or the like from a starting point through a single revolution in response to actuation of switch means; the improvement of means for compensating for angular displacement of the shaft from said starting point when the switch means is actuated comprising a projection on the shaft, a member reciprocable adjacent said shaft and having a detent at one end extending into the path of travel of said projection on the shaft whereby the projection will engage the detent when the shaft is in close proximity to said starting point, spring means urging said reciprocable member and its detent to move in a first direction such that the detent will be urged into engagement with said projection, means responsive to actuation of said switch means for withdrawing said detent out of the path of travel of said projection to permit said spring means to force the reciprocable member to move in said one direction, and circuit means including a switch actuable by said reciprocable member when it travels in said one direction by a predetermined amount for engaging said clutch and rotating the shaft.

7. In combination with an electrically controlled clutch and brake arrangement designed to rotate a crankshaft or the like from a starting point through a single revolution in response to actuation of switch means; the improvement of means for compensating for angular displacement of the shaft from said starting point when the switch means is actuated comprising a projection on said shaft, a reciprocable member positioned adjacent said shaft, a solenoid carried at one end of said reciprocable member and having an armature movable in a direction perpendicular to the direction of reciprocation of said member, first spring means urging said armature into the path of travel of said projection on the shaft such that the projection will engage the armature when the shaft is in close proximity to said starting point, the arrangement being such that the projection will cause said reciprocable member to move in one direction upon rotation of the shaft, spring means urging said reciprocable member to move in the opposite direction, circuit means responsive to actuation of said switch means for energizing said solenoid to withdraw its armature out of the path of travel of said projection, and circuit means including a switch device located in a fixed position and actuable by movement of said reciprocable member under the force of said second spring means for engaging said clutch to rotate the shaft.

8. In combination with an electrically controlled clutch and brake arrangement designed to rotate a crankshaft or the like from a starting point through a single revolution in response to actuation of switch means; the improvement of means for compensating for angular displacement of the shaft from said starting point when the switch means is actuated comprising a projection on said shaft, a rotatable member engageable with said projection and movable into or out of the path of travel of said projection, first spring means urging said rotatable member into the path of travel of said projection, second spring means urging said rotatable member to rotate in a direction opposite to the direction of rotation of said shaft, a switch actuable upon rotation of said member under the force of said second spring means to a predetermined angular position, means responsive to actuation of said first-mentioned switch means for withdrawing said rotatable member out of the path of travel of said projection, and circuit means responsive to actuation of said latter-mentioned switch for engaging said clutch to rotate the shaft.

9. In combination with an electrically controlled clutch and brake arrangement designed to rotate a crankshaft or the like from a starting point through a single revolution in response to actuation of switch means; the improvement of means for compensating for angular displacement of the shaft from said starting point when the switch means is actuated comprising a projection on said shaft, a member rotatable about an axis coincident with the axis of rotation of said shaft and having a detent engageable with said projection such that the member will rotate with the shaft when the detent engages the projection, first spring means urging said member toward said shaft such that the detent will be in the path of travel of said projection, second spring means urging said member to rotate in a direction oppositie to the direction of rotation of said shaft, a switch device actuable upon rotation of said member in said opposite direction under the force of said second spring means to a predetermined angular position, means responsive to actuation of said first-mentioned switch means for moving said member away from said shaft such that the detent will be out of the path of travel of said projection, and circuit means responsive to actuation of said switch device for engaging said clutch and rotating the shaft.

10. In combination with an electrically controlled clutch and brake arrangement designed to rotate a crankshaft or the like from a starting point through a single revolution in response to actuation of switch means; the improvement of means for compensating for angular displacement of the shaft from said starting point when the switch means is actuated comprising a projection on said shaft, a second shaft coaxial with said first-mentioned shaft, motor means for rotating said second shaft in the same direction as said first-mentioned shaft, clutch means for selectively engaging said motor means with said second shaft, a counterweight on said second shaft which, under the force of gravity, will cause said second shaft to assume a predetermined angular position whenever said latter-mentioned clutch means is not engaged, circuit means responsive to actuation of said switch means for engaging said latter-mentioned clutch to rotate the second shaft, a switch device on said second shaft and engageable with said projection on the first-mentioned shaft upon rotation of the second shaft, and circuit means responsive to actuation of said switch device for engaging said clutch to rotate said first-mentioned shaft.

11. In combination with an electrically controlled clutch and brake arrangement designed to rotate a crankshaft or the like from a starting point through a single revolution in response to actuation of switch means; the improvement of means for compensating for angular displacement of the shaft from said starting point when the switch means is actuated comprising a projection on said shaft, a device movable into a position where its one end is in the path of travel of said projection and engageable with the projection when the shaft is in close proximity to said starting point, adjustable spring means engaging the other end of said device and biasing said one end into engagement with said projection, circuit means including a switch for engaging said clutch upon movement of said device under the force of said spring, and mechanism actuable by said first-mentioned switch means for withdrawing said one end of the device out of the path of travel of said projection to permit the spring to move said first-mentioned device.

References Cited in the file of this patent

UNITED STATES PATENTS

| | | |
|---|---|---|
| 2,065,820 | Mellon | Dec. 29, 1936 |
| 2,133,542 | Jensen | Oct. 18, 1938 |